United States Patent
Wang (10) Patent No.: US 12,244,838 B2
(45) Date of Patent: Mar. 4, 2025

(54) VIDEO DECODING METHOD, APPARATUS, AND COMPUTER-READABLE MEDIUM WITH SUB-BLOCK TRANSFORM PARTITIONING

(71) Applicant: TENCENT TECHNOLOGY (SHENZHEN) COMPANY LIMITED, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 113 days.

(21) Appl. No.: 18/074,855

(22) Filed: Dec. 5, 2022

(65) Prior Publication Data
US 2023/0104359 A1    Apr. 6, 2023

Related U.S. Application Data

(63) Continuation of application No. PCT/CN2022/071732, filed on Jan. 13, 2022.

(30) Foreign Application Priority Data

Feb. 21, 2021 (CN) .................. 202110194810.5

(51) Int. Cl.
*H04N 19/44* (2014.01)
*H04N 19/119* (2014.01)
*H04N 19/176* (2014.01)

(52) U.S. Cl.
CPC ........... *H04N 19/44* (2014.11); *H04N 19/119* (2014.11); *H04N 19/176* (2014.11)

(58) Field of Classification Search
CPC ..... H04N 19/44; H04N 19/119; H04N 19/176
(Continued)

(56) References Cited

U.S. PATENT DOCUMENTS 7,330,509 B2    2/2008    Lu et al.
7,876,257 B2    1/2011    Vetro et al.
(Continued)

FOREIGN PATENT DOCUMENTS

CN    110234008 A1    9/2019
CN    111698504 A     9/2020
(Continued)

OTHER PUBLICATIONS

"Benjamin Bross, Versatile Video Coding (Draft 7), Oct. 2018, Joint Video Experts Team (JVET) of ITU-T SG 16 WP 3 and ISO/IEC JTC 1/SC 29/WG 11, 1-491" (Year: 2019).*
(Continued)

*Primary Examiner* — Stuart D Bennett
(74) *Attorney, Agent, or Firm* — ANOVA LAW GROUP PLLC (57) ABSTRACT

A video encoding method includes: acquiring a coding block of a video image frame; determining a partitioning mode available to the coding block according to a size of the coding block and an allowable maximum sub-block size ratio in response to a determination that sub-block transform (SBT) is to be performed on the coding block; determining, based on the partitioning mode available to the coding block, a target partitioning mode used during the SBT performed on the coding block; and partitioning the coding block based on the target partitioning mode, and decoding a plurality of sub-blocks obtained through the partitioning.

12 Claims, 7 Drawing Sheets

(58) Field of Classification Search
USPC .................................................. 375/240.25
See application file for complete search history.

(56) References Cited

U.S. PATENT DOCUMENTS

| | | |
|---|---|---|
| 8,238,442 B2 | 8/2012 | Liu |
| 8,526,495 B2 | 9/2013 | Liu et al. |
| 8,699,561 B2 | 4/2014 | Liu et al. |
| 9,049,452 B2 | 6/2015 | Liu et al. |
| 9,363,511 B2 | 6/2016 | Zhang et al. |
| 9,769,472 B2 | 9/2017 | Liu et al. |
| 10,397,569 B2 | 8/2019 | Liu et al. |
| 10,542,253 B2 | 1/2020 | Liu et al. |
| 10,567,801 B2 | 2/2020 | Zhao et al. |
| 10,575,013 B2 | 2/2020 | Liu et al. |
| 10,582,195 B2 | 3/2020 | Liu et al. |
| 10,609,384 B2 | 3/2020 | Chen et al. |
| 10,609,402 B2 | 3/2020 | Zhao et al. |
| 11,019,339 B2 | 5/2021 | Liu et al. |
| 2011/0268183 A1 | 11/2011 | Sole et al. |
| 2017/0064335 A1 | 3/2017 | Na et al. |
| 2017/0094271 A1 | 3/2017 | Liu et al. |
| 2018/0288441 A1 | 10/2018 | Zhang et al. |
| 2020/0288130 A1* | 9/2020 | Seregin ............... H04N 19/12 |
| 2022/0321915 A1* | 10/2022 | Kang .................. H04N 19/13 |
| 2024/0236373 A1 | 7/2024 | Lee |

FOREIGN PATENT DOCUMENTS

| | | | |
|---|---|---|---|
| CN | 111901593 A | 11/2020 | |
| WO | 2019016287 A1 | 1/2019 | |
| WO | 2019185815 A1 | 10/2019 | |
| WO | WO-2020156574 A1 * | 8/2020 | ........... H04N 19/119 |
| WO | 2020231229 A1 | 11/2020 | |
| WO | 2020262992 A1 | 12/2020 | |

OTHER PUBLICATIONS

The World Intellectual Property Organization (WIPO) International Search Report for PCT/CN2022/071732 Mar. 25, 2022 6 Pages (including translation).

China National Intellectual Property Administration (CNIPA) Office Action 1 for 202110194810. 5 Aug. 23, 2024 12 Pages (including translation).

* cited by examiner

VIDEO DECODING METHOD, APPARATUS, AND COMPUTER-READABLE MEDIUM WITH SUB-BLOCK TRANSFORM PARTITIONING

RELATED APPLICATION(S)

This application is a continuation application of PCT Patent Application PCT/CN2022/071732 filed on Jan. 13, 2022, which claims priority to Chinese Patent Application No. 202110194810.5, entitled "VIDEO ENCODING METHOD AND APPARATUS, VIDEO DECODING METHOD AND APPARATUS, COMPUTER-READABLE MEDIUM, AND ELECTRONIC DEVICE" and filed with the National Intellectual Property Administration, PRC on Feb. 21, 2021, all of which are incorporated herein by reference in entirety.

FIELD OF THE TECHNOLOGY

The present disclosure relates to the field of computer and communication technologies, and in particular, to a video encoding method and apparatus, a video decoding method and apparatus, a computer-readable medium, and an electronic device.

BACKGROUND

In Audio and Video coding Standard 3 (AVS3), the sub-block transform (SBT) technology is proposed. A coding block is partitioned into a plurality of sub-blocks for coding. However, the coding block may be partitioned into excessively narrow sub-blocks according to certain features of the AVS3 (the excessively narrow sub-blocks are sub-blocks differing greatly in widths and heights), which may degrade the hardware performance and affect the coding and decoding efficiency.

SUMMARY

Embodiments of the present disclosure provide a video encoding method and apparatus, a video decoding method and apparatus, a computer-readable medium, and an electronic device. In this way, an excessively narrow sub-block can be avoided at least to a certain extent during use of the sub-block transform (SBT) technology, thereby ensuring the performance of hardware, and improving the coding and decoding efficiency.

Other features and advantages of the present disclosure become obvious through the following detailed descriptions, or may be partially learned through the practice of the present disclosure.

In one aspect, the present disclosure provides a video decoding method, including: acquiring a coding block of a video image frame; determining a partitioning mode available to the coding block according to a size of the coding block and an allowable maximum sub-block size ratio in response to a determination that sub-block transform (SBT) is to be performed on the coding block; determining, based on the partitioning mode available to the coding block, a target partitioning mode used during the SBT performed on the coding block; and partitioning the coding block based on the target partitioning mode, and decoding a plurality of sub-blocks obtained through the partitioning.

According to the technical solutions of the embodiments of the present disclosure, an excessively narrow sub-block can be avoided during use of the SBT technology, thereby ensuring the performance of hardware, and improving the coding and decoding efficiency.

In another aspect, the present disclosure provides a video coding method, including: acquiring a residual coefficient block of a video image frame; determining partitioning modes available to the residual coefficient block according to a size of the residual coefficient block and an allowable maximum sub-block size ratio; selecting a target partitioning mode for the residual coefficient block from the partitioning modes that are available; and coding information of the target partitioning mode into a bit stream.

In yet another aspect, the present disclosure provides a video decoding apparatus including: a memory storing computer program instructions; and a processor coupled to the memory and configured to execute the computer program instructions and perform: acquiring a coding block of a video image frame; determining a partitioning mode available to the coding block according to a size of the coding block and an allowable maximum sub-block size ratio in response to a determination that sub-block transform (SBT) is to be performed on the coding block; determining, based on the partitioning mode available to the coding block, a target partitioning mode used during the SBT performed on the coding block; and partitioning the coding block based on the target partitioning mode, and decoding a plurality of sub-blocks obtained through the partitioning.

In yet another aspect, the present disclosure provides a video coding apparatus, including: a memory storing computer program instructions; and a processor coupled to the memory and configured to execute the computer program instructions and perform: acquiring a residual coefficient block of a video image frame; determining partitioning modes available to the residual coefficient block according to a size of the residual coefficient block and an allowable maximum sub-block size ratio; selecting a target partitioning mode for the residual coefficient block from the partitioning modes that are available; and coding information of the target partitioning mode into a bit stream.

In yet another aspect, the present disclosure provides a computer-readable medium is provided, storing a computer program, the computer program, when executed by a processor, implementing the video decoding method according to the embodiments.

It is to be understood that the general descriptions and the following detailed descriptions are merely exemplary and explanatory, and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

In addition, the described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be implemented without one or more of the specific details, or another method, unit, apparatus, or step may be used. Well-known methods, apparatuses, implementations, or operations are not shown or described in detail, to avoid obscuring aspects of the present disclosure.

Figure 1:
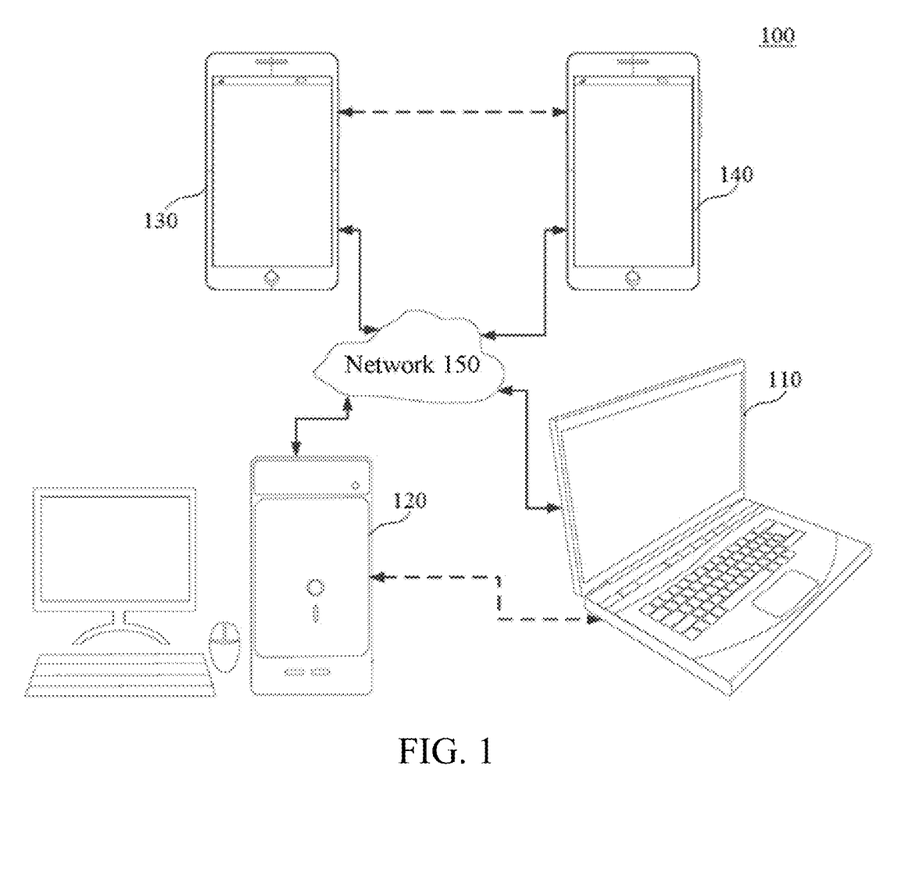
FIG. 1 is a schematic diagram of an exemplary system architecture according to certain embodiment(s) of the present disclosure.

FIG. 1 is a schematic diagram of an exemplary system architecture to which a technical solution in an embodiment of the present disclosure is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bit streams. The second terminal apparatus 120 may receive the coded video data through the network 150, decode the coded video data to recover the video data, and display a video picture according to the recovered video data.

In an embodiment of the present disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in the present disclosure may not be limited thereto. The embodiments disclosed in the present disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in a circuit switching channel and/or a packet switching channel. The network may include a telecommunication network, a local area network, a wide area network, and/or the Internet. For the purpose of the present disclosure, unless explained below, an architecture and a topology of the network 150 may be inessential to the operation disclosed in the present disclosure.

Figure 2:
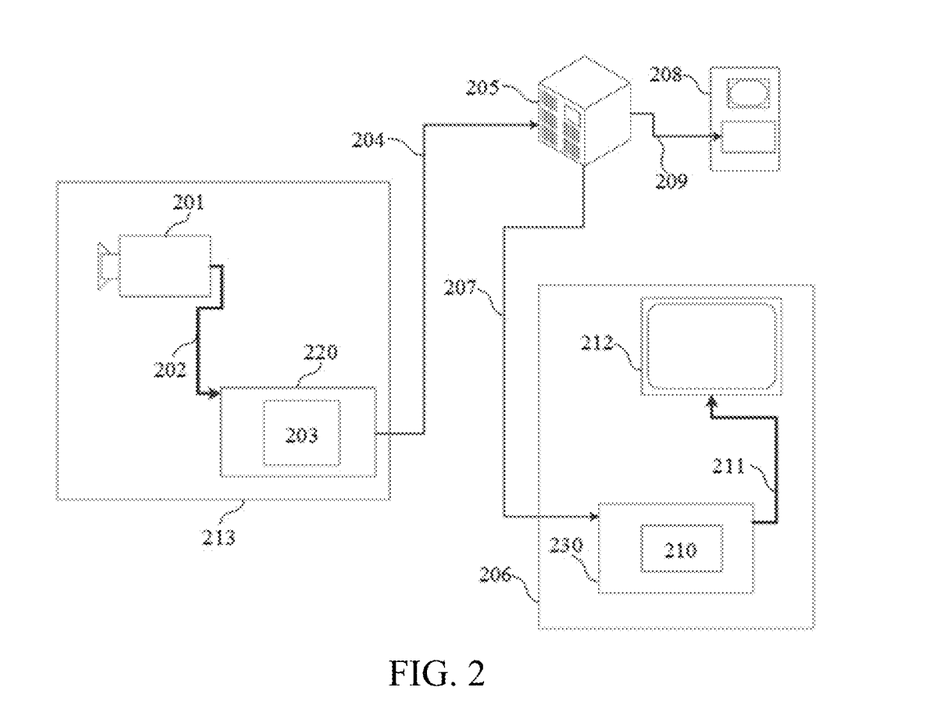
FIG. 2 is a schematic diagram of a placement manner of a video coding apparatus and a video decoding apparatus in a streaming transmission system.

In an embodiment of the present disclosure, FIG. 2 shows a placement manner of a video coding apparatus and a video decoding apparatus in a streaming transmission environment. The subject disclosed in the present disclosure may be comparably applicable to other video-enabled applications, including, for example, a video conference, a digital television (TV), and storage of compressed videos on digital media including a CD, a DVD, and a memory stick.

A streaming transmission system may include a capture subsystem 213. The capture subsystem 213 may include a video source 201 such as a digital camera. The video source creates an uncompressed video picture stream 202. In the embodiment, the video picture stream 202 includes a sample captured by the digital camera. Compared with the coded video data 204 (or a coded video bit stream 204), the video picture stream 202 is depicted by a thick line to emphasize the video picture stream with a large data volume. The video picture stream 202 may be processed by an electronic device 220. The electronic device 220 includes a video coding apparatus 203 coupled to the video source 201. The video coding apparatus 203 may include hardware, software, or a combination of hardware and software to realize or implement various aspects of the disclosed subject matter described in more detail below. Compared with the video picture stream 202, the coded video data 204 (or a coded video bit stream 204) is depicted by a thin line to emphasize the coded video data 204 with a small data volume (or a coded video bit stream 204), which may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or an other presence apparatus. In some streaming transmission systems, the coded video data 204, the video data 207, and the video data 209 (for example, the video bit stream) may be coded according to some video coding/compression standards. Embodiments of the standards include ITU-T H.265. In the embodiment, a video coding standard under development is informally referred to as versatile video coding (VVC). The present disclosure may be used in the context of the VVC standard.

The electronic device 220 and the electronic device 230 may include other components not shown in the figure. For example, the electronic device 220 may include a video decoding apparatus, and the electronic device 230 may further include a video coding apparatus.

In an embodiment of the present disclosure, international video coding standards such as High Efficiency Video Coding (HEVC) and the VVC and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more coding units (CU). The CU is the most element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. A coder end is desired to select a predictive coding mode for a current CU and inform a decoder end. The intra prediction means that a predicted signal comes from a region that has been coded and reconstructed in a same image. The inter prediction means that the predicted signal comes from a coded image (referred to as a reference image) that is different from a current image.

Transform and Quantization: A residual video signal is transformed into a transform domain through a transform operation such as discrete Fourier transform (DFT) and DCT, which is referred to as a transform coefficient. A lossy quantization operation is further performed on the transform coefficient, which loses a specific amount of information, so that the quantized signal facilitates compressed expression. In some video coding standards, more than one transform mode may be selected. Therefore, the coder end is also desired to select one transform mode for the current CU and inform the decoder end. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which usually brings less distortion and a higher bit rate.

Entropy coding or statistical coding: Statistical compression coding is performed on the quantized signal in the transform domain according to a frequency of occurrence of each value, and finally a binarized (0 or 1) compressed bit stream is outputted. In addition, entropy coding is also desired to be performed on other information generated during the coding, such as the selected coding mode and motion vector data, to reduce a bit rate. Statistical coding is a lossless coding manner that can effectively reduce a bit rate desired for expressing a same signal. A common statistical coding mode includes variable length coding (VLC for short) or context adaptive binary arithmetic coding (CABAC for short).

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the filtering operation is also referred to as loop filtering, that is, a filtering operation in a coding loop.

Figure 3:
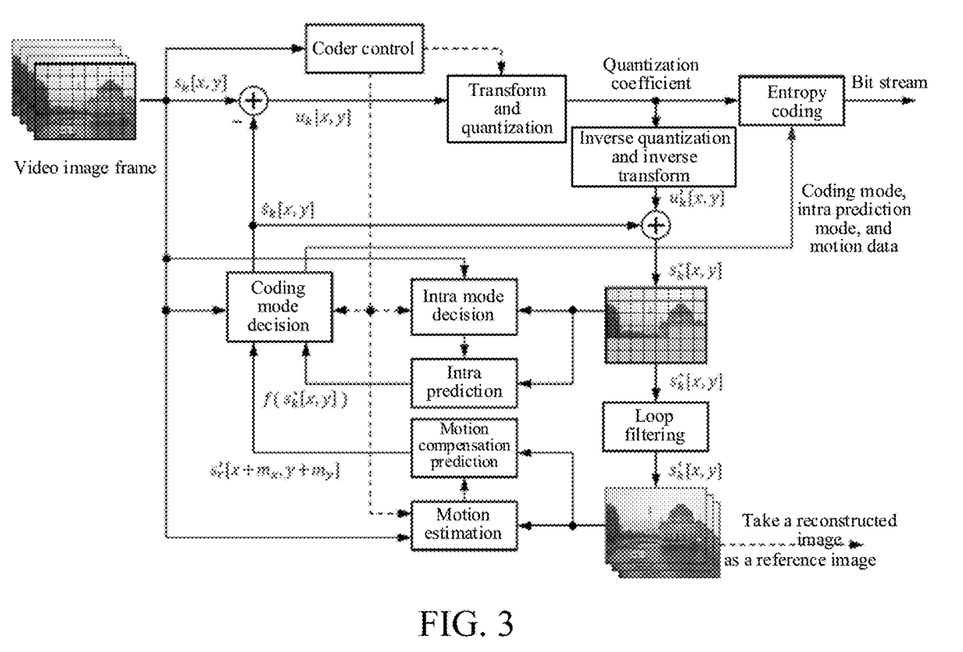
FIG. 3 is a schematic flowchart of a video coder.

In an embodiment of the present disclosure, FIG. 3 is a flowchart of a video coder. In this process, intra prediction is used as an example for description. A difference between an original image signal $s_k[x, y]$ and a predicted image signal $\hat{s}_k[x, y]$ is calculated to obtain a residual signal $u_k[x, y]$, and the residual signal $u_k[x, y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u'_k[x, y]$. The predicted image signal $\hat{s}_k[x, y]$ is superimposed with the reconstructed residual signal $u'_k[x, y]$ to generate an image signal $s^*_k[x, y]$. The image signal $s^*_k[x, y]$ is inputted to an intra mode decision module and an intra prediction module for intra prediction, and is further subjected to loop filtering to output a reconstructed image signal $s'_k[x, y]$. The reconstructed image signal $s'_k[x, y]$ may be used as a reference image for a next frame for motion estimation and motion compensation prediction. A predicted image signal $\hat{s}_k[x, y]$ of the next frame is obtained based on a result $s'_r[x+m_x, y+m_y]$ of the motion compensation prediction and a result $f(s_k[x, y])$ of the intra prediction. The above process may be repeated.

Based on the coding process, on the decoder end, for each CU, after a compressed bit stream is acquired, entropy decoding is performed to obtain various mode information and quantization coefficients. Inverse quantization and inverse transform are performed on the quantization coefficients to obtain a residual signal. Moreover, a predicted signal corresponding to the CU can be obtained according to coding mode information that is known. The residual signal may be added to the predicted signal to obtain a reconstructed signal. The reconstructed signal is subjected to operations such as loop filtering to generate a final output signal.

During the above coding and decoding, the transform processing performed on the residual signal causes energy of the residual signal to concentrate on few low-frequency coefficients, that is, most coefficients have relatively small values. After processing by a subsequent quantization module, the relatively small coefficient values become zero, which greatly reduces costs of coding the residual signal. However, due to diversified residual distribution, the DCT cannot adapt to all residual characteristics. Therefore, transform kernels such as DST7 and DCT8 are applied to the transform process, and horizontal transform and vertical transform of the residual signal can be performed by using different transform kernels. An adaptive multiple core transform (AMT) technology is used as an example. In certain embodiment(s), transform combinations for transform processing of the residual signal include (DCT2, DCT2), (DCT8, DCT8), (DCT8, DST7), (DST7, DCT8), and (DST7, DST7).

Figure 4:
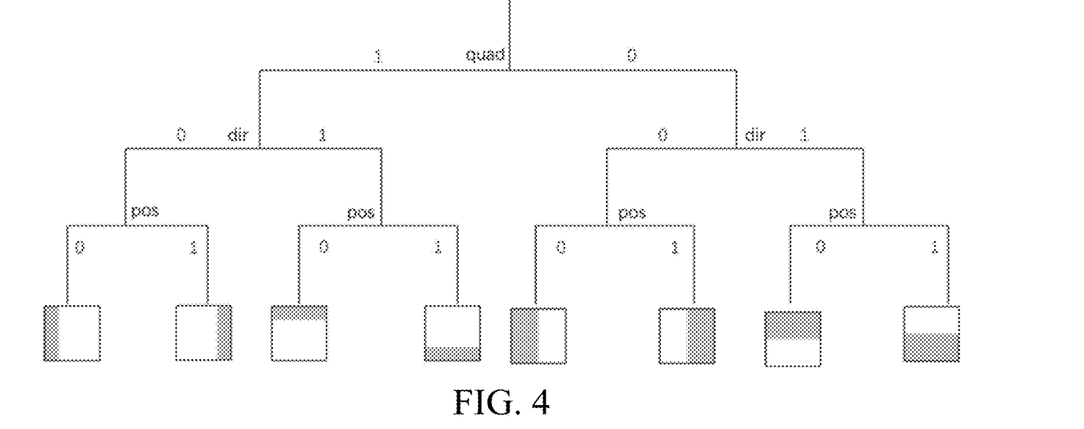
FIG. 4 is an analytical schematic diagram of partitioning and deriving through sub-block transform (SBT)

In addition, the sub-block transform (SBT) technology is also proposed in AVS3. FIG. 4 is an analytical diagram of partitioning and deriving through SBT. 8 sub-block partition results exist through the SBT. Transform coding is performed only on gray parts (non-zero residual sub-blocks) in the sub-blocks, and white parts (zero residual sub-blocks) are forcibly cleared. In certain embodiment(s), the related description of the SBT in the AVS3 is shown in Table 1 below.

partitioning mode identifier, and SbtHorQuad represents a horizontal quad partitioning mode identifier.

That is to say, in the current AVS3, a size of the coding block that can execute the SBT is to satisfy the following condition: (width<=64) && (height<=64) && (width>4|| height>4). Moreover, on this basis, further limitations are imposed on the size of the coding block with different partitioning modes, which are described as follows.

For the horizontal quad partitioning mode: SbtHorQuad=height>=16? 1:0, the value of SbtHorQuad of 1 indicating that the horizontal quad partitioning mode is allowed, and the value of SbtHorQuad of 0 indicating that the horizontal quad partitioning mode is prohibited.

For the horizontal half partitioning mode: SbtHorHalf=height>=8? 1:0, the value of SbtHorHalf of 1 indicating that the horizontal half partitioning mode is allowed, and the value of SbtHorHalf of 0 indicating that the horizontal half partitioning mode is prohibited.

For the vertical quad partitioning mode: SbtVerQuad=width>=16? 1:0, the value of SbtVerQuad of 1 indicating that the vertical quad partitioning mode is allowed, and the value of SbtVerQuad of 0 indicating that the vertical quad partitioning mode is prohibited.

For the vertical half partitioning mode: SbtVerHalf=width>=8? 1:0, the value of SbtVerHalf of 1 indicating that the vertical half partitioning mode is allowed, and the value of SbtVerHalf of 0 indicating that the vertical half partitioning mode is prohibited.

Still referring to Table 1, if the value of SbtVerHalf or SbtHorHalf is 1, and the value of SbtVerQuad or SbtHorQuad is 1, sbt_quad_flag (the value is 0 or 1) is to be parsed. If the values of SbtQuadFlag, SbtVerQuad, and SbtHorQuad are all 1, or the values of ! SbtQuadFlag, SbtVerHalf, and SbtHorHalf are all 1, sbt_dir_flag (the value is 0 or 1) is to be parsed.

Based on Table 1, as shown in FIG. 4, if the value of quad is 1, the value of dir is 0, and the value of pos is 0, the vertical quad partitioning mode is adopted, the transform coding is performed only on left sub-blocks (a gray part),

TABLE 1

```
if (SbtEnableFlag && (width <= 64) && (height <= 64) && (width >4 || height > 4)
&& (InterpfFlag == 0) && ctp_y[0] ) {
    sbt_cu_flag
    if (SbtCuFlag) {
        SbtVerHalf = width >= 8
        SbtVerQuad = width >= 16
        SbtHorHalf = height >= 8
        SbtHorQuad = height >= 16
        if ( (SbtVerHalf || SbtHorHalf) && (SbtVerQuad || SbtHorQuad) ) {
            sbt_quad_flag
        }
        if ( (SbtQuadFlag && SbtVerQuad && SbtHorQuad) || (!SbtQuadFlag &&
SbtVerHalf && SbtHorHalf)) {
            sbt_dir_flag
        }
    }
}
```

As shown in Table 1, after an enable flag bit SbtEnableFlag of SBT is enabled and conditions such as a width and a height of a coding block are satisfied, sbt_cu_flag is parsed and assigned to the SbtCuFlag (the value is 0 or 1). If the SbtCuFlag is 1, conditional assignment is performed as follows: SbtVerHalf=width>=8, SbtVerQuad=width>=16, SbtHorHalf=height>=8, and SbtHorQuad=height>=16. SbtVerHalf represents a vertical half partitioning mode identifier, SbtVerQuad represents a vertical quad partitioning mode identifier, SbtHorHalf represents a horizontal half and other sub-blocks (a white part) are forcibly cleared. If the value of quad is 1, the value of dir is 0, and the value of pos is 1, the vertical quad partitioning mode is adopted, the transform coding is performed only on right sub-blocks (a gray part), and other sub-blocks (a white part) are forcibly cleared. If the value of quad is 1, the value of dir is 1, and the value of pos is 0, the horizontal quad partitioning mode is adopted, the transform coding is performed only on upper sub-blocks (a gray part), and other sub-blocks (a white part) are forcibly cleared. If the value of quad is 1, the value of dir is 1, and the value of pos is 1, the horizontal quad partitioning mode is adopted, the transform coding is performed only on lower sub-blocks (a gray part), and other sub-blocks (a white part) are forcibly cleared. If the value of quad is 0, the value of dir is 0, and the value of pos is 0, the vertical half partitioning mode is adopted, the transform coding is performed only on left sub-blocks (a gray part), and other sub-blocks (a white part) are forcibly cleared. If the value of quad is 0, the value of dir is 0, and the value of pos is 1, the vertical half partitioning mode is adopted, the transform coding is performed only on right sub-blocks (a gray part), and other sub-blocks (a white part) are forcibly cleared. If the value of quad is 0, the value of dir is 1, and the value of pos is 0, the horizontal half partitioning mode is adopted, the transform coding is performed only on upper sub-blocks (a gray part), and other sub-blocks (a white part) are forcibly cleared. If the value of quad is 0, the value of dir is 1, and the value of pos is 1, the horizontal half partitioning mode is adopted, the transform coding is performed only on lower sub-blocks (a gray part), and other sub-blocks (a white part) are forcibly cleared.

The quad in FIG. 4 may be regarded as size control syntax of the sub-block, and both dir and pos may be regarded as syntax for controlling a position of the sub-block. In other words, the quad determines a size (an area) of the sub-block, and dir and pos determine the position of the sub-block. In addition, quad, dir, and pos in FIG. 4 respectively correspond to sbt_quad_flag, sbt_dir_flag, and sbt_pos_flag in the AVS3 text. sbt_quad_flag and the sbt_dir_flag may be directly parsed from the bit stream (referring to Table 1), and sbt_pos_flag is implicitly derived through statistics collected on coefficients. The specific SBT partitioning mode is jointly determined by sbt_quad_flag, sbt_dir_flag, and sbt_pos_flag.

Figure 5:
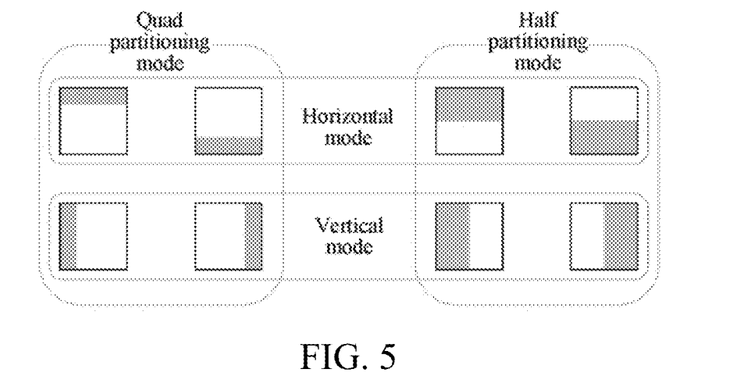
FIG. 5 is a schematic diagram of a partitioning mode of SBT.

It may be learned based on FIG. 4 that the 8 partitioning modes of the SBT may be classified according to the partitioning mode and the partition direction shown in FIG. 5. The horizontal mode and the vertical mode respectively represent partitioning of the current coding block in the horizontal direction and the vertical direction, and the quad partitioning mode and the half partitioning mode respectively indicate that ¼ and ½ of sub-blocks are partitioned along the corresponding partition direction for coding.

In the 8 partitioning modes of the SBT, the gray sub-blocks are not further partitioned, and the coefficient coding is directly performed.

Figure 6:
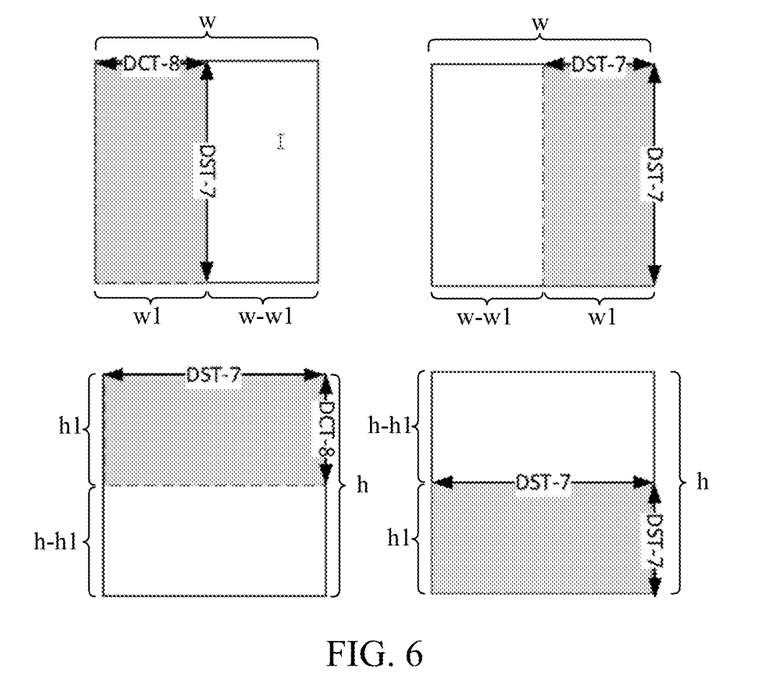
FIG. 6 is a schematic diagram of a transform combination in the SBT technology.

Regarding the selection of the sub-blocks through transform and combination, when a width or a height of a non-zero residual sub-block is 64, the horizontal transform and the vertical transform of the non-zero residual sub-block are both DCT-2. The selection of the horizontal transform and the vertical transform is shown in FIG. 6. In FIG. 6, the gray part in the sub-block is coded through the horizontal transform and vertical transform according to the identified transform mode, and the white part is forcibly cleared. w1 in FIG. 6 may be ½ of w (width), or may be ¼ of w, and h1 may be ½ of h (height), or may be ¼ of h.

In addition, quantization and coefficient coding are directly performed by configuring the encoder to skip the transform during the residual coding of the gray part.

Although a current SBT scheme in the AVS3 imposes certain limitations on the size of the coding block, after the coding block is partitioned, an excessively narrow sub-block may still be generated. For example, for a 64×8 (width× height) coding block, horizontal half partitioning is performed to generate a 64×4 transform block, which is excessively narrow in the horizontal direction. For a 64×16 (width×height) coding block, horizontal quad partitioning is performed to generate a 64×4 transform block, which is excessively narrow in the horizontal direction. Since the excessively narrow transform block reduces the hardware performance and affects the coding and decoding efficiency, the technical solution of the embodiment of the present disclosure proposes a solution for further limiting the coding block by using the SBT technology, which avoids obtaining the excessively narrow sub-block through the partitioning, effectively ensures the performance of hardware, and improves the coding and decoding efficiency. The detailed description is given below.

Figure 7:
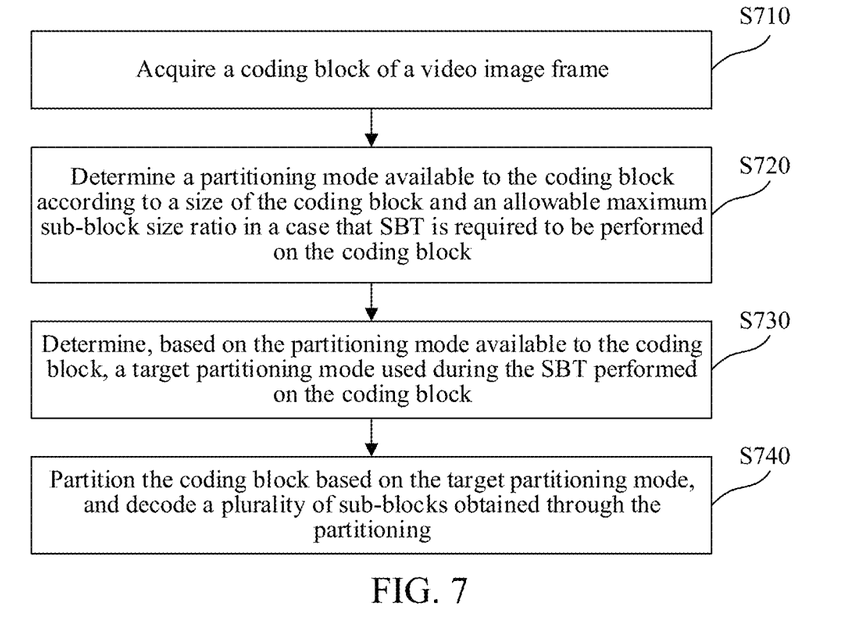
FIG. 7 is a schematic flowchart of a video decoding method according to according to certain embodiment(s) of the present disclosure.

FIG. 7 is a flowchart of a video decoding method according to an embodiment of the present disclosure. The video decoding method may be performed by a device having a computing processing function, for example, may be performed by a terminal device or a server. Referring to FIG. 7, the video decoding method includes at least step S710 to step S740. The detailed description is as follows.

In step S710, a coding block of a video image frame is acquired.

In an embodiment of the present disclosure, a video image frame sequence includes a series of images. Each image may be further partitioned into slices, and the slices may be further partitioned into a series of LCUs (or CTUs), each LCU including a plurality of CUs. The video image frame is coded by block during coding. In some new video coding standards, for example, in the H.264 standard, a macroblock (MB) is provided. The MB may be further partitioned into a plurality of prediction blocks that may be used for predictive coding. In the HEVC standard, concepts such as a CU, a prediction unit (PU), and a transform unit (TU) are used, various block units are partitioned by function, and a new tree-based structure is used for description. For example, a CU may be partitioned into smaller CUs according to a quadtree, and the smaller CUs may be further partitioned to form a quadtree structure. The coding block in this embodiment of the present disclosure may be a CU, or a block smaller than the CU, such as a smaller block obtained by partitioning the CU.

In step S720, a partitioning mode available to the coding block is determined according to a size of the coding block and an allowable maximum sub-block size ratio in response to a determination that SBT is desired to be performed on the coding block.

In an embodiment of the present disclosure, it may be determined, according to an explicit index and/or an implicitly derived index included in the coding block, whether the coding block is desired to adopt the SBT technology.

In an embodiment of the present disclosure, the maximum sub-block size ratio includes a maximum width-height ratio and a maximum height-width ratio, a value of the maximum width-height ratio being equal to a value of the maximum height-width ratio. A value of the maximum sub-block size ratio may be decoded from a sequence header of the video image frame.

In an embodiment of the present disclosure, the maximum sub-block size ratio may include a maximum width-height ratio and a maximum height-width ratio, a value of the maximum width-height ratio being not equal to a value of the maximum height-width ratio. The value of the maximum width-height ratio and the value of the maximum height-width ratio may be decoded from a sequence header of the video image frame.

In an embodiment of the present disclosure, the value of the maximum sub-block size ratio may reuse the value of an allowable maximum coding block size ratio in the standard.

That is to say, the value of the maximum sub-block size ratio may be the same as the value of the allowable maximum coding block size ratio.

In an embodiment of the present disclosure, the process of determining the partitioning mode available to the coding block according to the size of the coding block and the allowable maximum sub-block size ratio includes: allowing a vertical half partitioning mode for the coding block in response to a determination that a width of the coding block is greater than or equal to 8 and twice a height of the coding block is less than or equal to a product of the width and the maximum sub-block size ratio, or otherwise prohibiting the vertical half partitioning mode for the coding block. In the embodiment, the maximum sub-block size ratio is the maximum height-width ratio.

In an embodiment of the present disclosure, the process of determining the partitioning mode available to the coding block according to the size of the coding block and the allowable maximum sub-block size ratio includes: allowing a vertical quad partitioning mode for the coding block in response to a determination that a width of the coding block is greater than or equal to 16 and 4 times a height of the coding block is less than or equal to a product of the width and the maximum sub-block size ratio, or otherwise prohibiting the vertical quad partitioning mode for the coding block. In the embodiment, the maximum sub-block size ratio is the maximum height-width ratio.

In an embodiment of the present disclosure, the process of determining the partitioning mode available to the coding block according to the size of the coding block and the allowable maximum sub-block size ratio includes: allowing a horizontal half partitioning mode for the coding block in response to a determination that a height of the coding block is greater than or equal to 8 and twice a width of the coding block is less than or equal to a product of the height and the maximum sub-block size ratio, or otherwise prohibiting the horizontal half partitioning mode for the coding block. In the embodiment, the maximum sub-block size ratio is the maximum width-height ratio.

In an embodiment of the present disclosure, the process of determining the partitioning mode available to the coding block according to the size of the coding block and the allowable maximum sub-block size ratio includes: allowing a horizontal quad partitioning mode for the coding block in response to a determination that a height of the coding block is greater than or equal to 16 and 4 times a width of the coding block is less than or equal to a product of the height and the maximum sub-block size ratio, or otherwise prohibiting the horizontal quad partitioning mode for the coding block. In the embodiment, the maximum sub-block size ratio is the maximum width-height ratio.

Still referring to FIG. 7, in step S730, a target partitioning mode used during the SBT performed on the coding block is determined based on the partitioning mode available to the coding block.

In an embodiment of the present disclosure, for specific determination of the target partitioning mode used during the SBT performed on the coding block, reference may be made to the technical solutions of the embodiments (such as the solutions shown in Table 1 and FIG. 4), and the details are not described again.

In step S740, the coding block is partitioned based on the target partitioning mode, and a plurality of sub-blocks obtained through the partition are decoded.

In an embodiment of the present disclosure, during the decoding of the plurality of sub-blocks obtained through the partitioning, either a transform skip operation or an inverse transform operation can be performed on the sub-blocks. The process is an inverse process of the coder end. If the coder end performs the transform skip operation on the sub-blocks, the decoder end also performs the transform skip operation on the sub-blocks. If the coder end performs the transform operation on the sub-blocks, the decoder end also performs the inverse transform operation on the sub-blocks.

Based on the above, the technical solutions of the embodiments of the present disclosure further add the following limitations based on the existing coding block size limitations of the SBT.

For the horizontal quad partitioning mode: SbtHorQuad= (width×4 height×MaxPartRatio)? SbtHorQuad: 0, the value of SbtHorQuad of 1 indicating that the horizontal quad partitioning mode is allowed, and the value of SbtHorQuad of 0 indicating that the horizontal quad partitioning mode is prohibited.

For the horizontal half partitioning mode: SbtHorHalf= (width×2 height×MaxPartRatio)? SbtHorHalf: 0, the value of SbtHorHalf of 1 indicating that the horizontal half partitioning mode is allowed, and the value of SbtHorHalf of 0 indicating that the horizontal half partitioning mode is prohibited.

For the vertical quad partitioning mode: SbtVerQuad= (height×4 width×MaxPartRatio)? SbtVerQuad: 0, the value of SbtVerQuad of 1 indicating that the vertical quad partitioning mode is allowed, and the value of SbtVerQuad of 0 indicating that the vertical quad partitioning mode is prohibited.

For the vertical half partitioning mode: SbtVerHalf= (height×2 width×MaxPartRatio)? SbtVerHalf: 0, the value of SbtVerHalf of 1 indicating that the vertical half partitioning mode is allowed, and the value of SbtVerHalf of 0 indicating that the vertical half partitioning mode is prohibited.

MaxPartRatio represents the allowable maximum sub-block size ratio, and the maximum sub-block size ratio includes the maximum width-height ratio and the maximum height-width ratio (both are non-zero integers). Generally, the maximum width-height ratio and the maximum height-width ratio are equal. If the maximum width-height ratio and the maximum height-width ratio are not equal, the maximum size ratio may use the maximum width-height ratio for the horizontal quad partitioning mode and the horizontal half partitioning mode, and for the vertical quad partitioning mode and the vertical half partitioning mode, the maximum size ratio may use the maximum height-width ratio.

In an embodiment of the present disclosure, if the maximum width-height ratio and the maximum height-width ratio are equal, the coding may be performed in the sequence header when the SBT is enabled, and the allowable maximum coding block width-height ratio in the existing AVS3 may also be reused. That is to say, the value of the maximum sub-block size ratio may be the same as the value of the allowable maximum coding block size ratio. If the maximum width-height ratio and the maximum height-width ratio are not equal, the coding may be performed in the sequence header when the SBT is enabled.

Based on the limiting conditions added to the embodiments of the present disclosure, the related description of the SBT may be modified as shown in Table 2:

TABLE 2

```
if (SbtEnableFlag && (width <= 64) && (height <= 64) && (width > 4 || height > 4)
&& (InterpfFlag == 0) && ctp_y[0] ) {
    sbt_cu_flag
    if (SbtCuFlag) {
        SbtVerHalf = (width >= 8 && (heightx2 <= widthxMaxPartRatio))
        SbtVerQuad = (width >= 16 && (heightx4 <= widthxMaxPartRatio))
        SbtHorHalf = (height >= 8 && (widthx2 <= heightxMaxPartRatio))
        SbtHorQuad = (height >= 16 && (widthx4 <= heightxMaxPartRatio))
        if ( (SbtVerHalf || SbtHorHalf) && (SbtVerQuad || SbtHorQuad) ) {
            sbt_quad_flag
        }
        if ( (SbtQuadFlag && SbtVerQuad && SbtHorQuad) || (!SbtQuadFlag &&
SbtVerHalf && SbtHorHalf)) {
            sbt_dir_flag
        }
    }
}
```

Based on the related limiting conditions shown in Table 2, in an embodiment of the present disclosure, if MaxPartRatio=8, a 8×64 coding block is prohibited from being partitioned into 4×64 sub-blocks through vertical half partitioning; a 16×64 coding block is prohibited from being partitioned into 4×64 sub-blocks through vertical quad partitioning; a 64×8 coding block is prohibited from being partitioned into 64×4 sub-blocks through horizontal half partitioning; and a 64×16 coding block is prohibited from being partitioned into 64×4 sub-blocks through horizontal quad partitioning. It can be seen that the technical solution of the embodiment of the present disclosure can limit the partitioning mode of the coding block by using the allowable maximum sub-block size ratio and the size of the coding block, which avoids obtaining the excessively narrow sub-block through the partitioning, effectively ensures the performance of hardware, and improves the coding and decoding efficiency.

In the embodiment, a coder end is desired to perform a video coding method. The video coding method may be performed by a device having a computing processing function at the coder end, for example, may be performed by a terminal device or a server. The video coding method may include: determining partitioning modes available to a residual coefficient block according to a size of the residual coefficient block and an allowable maximum sub-block size ratio, selecting a target partitioning mode for the residual coefficient block from the partitioning modes that are available, and coding information of the target partitioning mode into a bit stream, after the residual coefficient block of a video image frame is acquired.

In the embodiment, the coder end may select, as the target partitioning mode based on rate distortion optimization (RDO), an optimal partitioning mode from the partitioning modes available to the residual coefficient block.

The following describes apparatus embodiments of the present disclosure, and the apparatus embodiments may be used for performing the video decoding method in the embodiment of the present disclosure. For details not disclosed in the apparatus embodiments of the present disclosure, reference is made to the embodiments of the video decoding method in the present disclosure.

Figure 8:
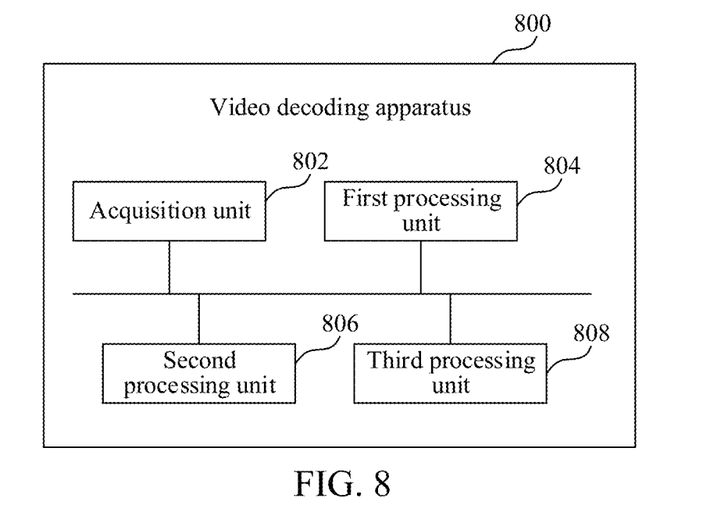
FIG. 8 is a schematic block diagram of a video decoding apparatus according to according to certain embodiment(s) of the present disclosure.

FIG. 8 is a block diagram of a video decoding apparatus according to an embodiment of the present disclosure. The video decoding apparatus may be arranged in a device with a computing processing function, for example, may be arranged in a terminal device or a server.

Referring to FIG. 8, a video decoding apparatus 800 according to an embodiment of the present disclosure includes an acquisition unit 802, a first processing unit 804, a second processing unit 806, and a third processing unit 808.

The acquisition unit 802 is configured to acquire a coding block of a video image frame. The first processing unit 804 is configured to determine a partitioning mode available to the coding block according to a size of the coding block and an allowable maximum sub-block size ratio in response to a determination that SBT is desired to be performed on the coding block. The second processing unit 806 is configured to determine, based on the partitioning mode available to the coding block, a target partitioning mode used during the SBT performed on the coding block. The third processing unit 808 is configured to partition the coding block based on the target partitioning mode, and decode a plurality of sub-blocks obtained through the partitioning.

In some embodiments of the present disclosure, based on the solutions, the first processing unit 804 is configured to: allow a vertical half partitioning mode for the coding block in response to a determination that a width of the coding block is greater than or equal to 8 and twice a height of the coding block is less than or equal to a product of the width and the maximum sub-block size ratio, or otherwise prohibit the vertical half partitioning mode for the coding block.

In some embodiments of the present disclosure, based on the solutions, the first processing unit 804 is configured to: allow a vertical quad partitioning mode for the coding block in response to a determination that a width of the coding block is greater than or equal to 16 and 4 times a height of the coding block is less than or equal to a product of the width and the maximum sub-block size ratio, or otherwise prohibit the vertical quad partitioning mode for the coding block.

In some embodiments of the present disclosure, based on the solutions, the maximum sub-block size ratio is a maximum height-width ratio.

In some embodiments of the present disclosure, based on the solutions, the first processing unit 804 is configured to: allow a horizontal half partitioning mode for the coding block in response to a determination that a height of the coding block is greater than or equal to 8 and twice a width of the coding block is less than or equal to a product of the height and the maximum sub-block size ratio, or otherwise prohibit the horizontal half partitioning mode for the coding block.

In some embodiments of the present disclosure, based on the solutions, the first processing unit 804 is configured to: allow a horizontal quad partitioning mode for the coding block in response to a determination that a height of the coding block is greater than or equal to 16 and 4 times a width of the coding block is less than or equal to a product of the height and the maximum sub-block size ratio, or otherwise prohibit the horizontal quad partitioning mode for the coding block.

In some embodiments of the present disclosure, based on the solutions, the maximum sub-block size ratio is a maximum sub-block width-height ratio.

In some embodiments of the present disclosure, based on the solutions, the maximum sub-block size ratio includes the maximum width-height ratio and the maximum height-width ratio, a value of the maximum width-height ratio being equal to a value of the maximum height-width ratio. The video decoding apparatus 800 further includes a first decoding unit, configured to decode a value of the maximum sub-block size ratio from a sequence header of the video image frame.

In some embodiments of the present disclosure, based on the solutions, the maximum sub-block size ratio includes the maximum width-height ratio and the maximum height-width ratio, and the value of the maximum width-height ratio is not equal to the value of the maximum height-width ratio. The video decoding apparatus 800 further includes a second decoding unit, configured to decode the value of the maximum width-height ratio and the value of the maximum height-width ratio from a sequence header of the video image frame.

In some embodiments of the present disclosure, based on the solutions, the value of the maximum sub-block size ratio is the same as the value of the allowable maximum coding block size ratio.

In some embodiments of the present disclosure, based on the solutions, the third processing unit 808 is configured to perform a transform skip operation or an inverse transform operation during the decoding of the plurality of sub-blocks obtained through division.

An embodiment of the present disclosure further provides a video coding apparatus. The video coding apparatus may be arranged in a device having a computing processing function at a coder end, for example, may be arranged in a terminal device or a server. The video coding apparatus may include: an acquisition unit, configured to acquire a residual coefficient block of a video image frame; a fourth processing unit, configured to determine partitioning modes available to the residual coefficient block according to a size of the residual coefficient block and an allowable maximum sub-block size ratio; a selection unit, configured to select a target partitioning mode for the residual coefficient block from the partitioning modes that are available; and a coding unit (CU), configured to code information of the target partitioning mode into a bit stream.

In the technical solutions provided in some embodiments of the present disclosure, the partitioning mode available to the coding block is determined according to the size of the coding block and the allowable maximum sub-block size ratio when the SBT is desired to be performed on the coding block. In this way, the partitioning mode of the coding block can be limited by using the allowable maximum sub-block size ratio and the size of the coding block, which avoids obtaining the excessively narrow sub-block through the partitioning, effectively ensures the performance of hardware, and improves the coding and decoding efficiency.

Figure 9:
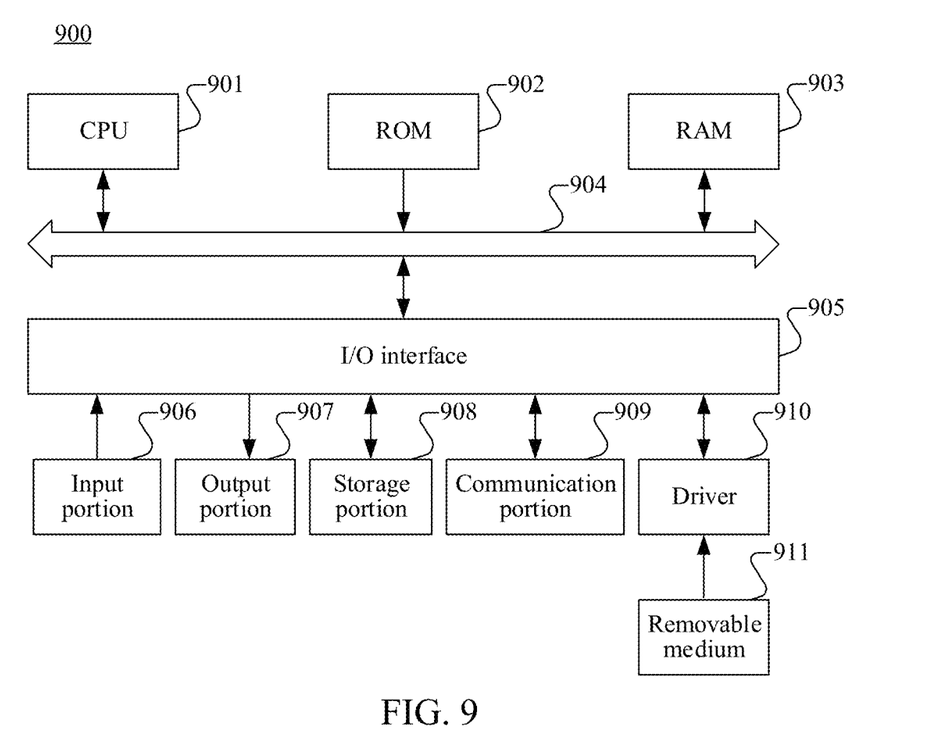
FIG. 9 is a schematic structural diagram of a computer system adapted to implement an electronic device according to according to certain embodiment(s) of the present disclosure.

FIG. 9 is a schematic structural diagram of a computer system adapted to implement an electronic device according to an embodiment of the present disclosure.

A computer system 900 of the electronic device shown in FIG. 9 is merely an example, and does not constitute any limitation to functions and use ranges of the embodiments of the present disclosure.

As shown in FIG. 9, the computer system 900 includes a central processing unit (CPU) 901, which may perform various suitable actions and processing based on a program stored in a read-only memory (ROM) 902 or a program loaded from a storage part 908 into a random access memory (RAM) 903, for example, perform the method described in the embodiments. The RAM 903 further stores various programs and data desired for system operations. The CPU 901, the ROM 902, and the RAM 903 are connected to each other by using a bus 904. An input/output (I/O) interface 905 is also connected to the bus 904.

The following components are connected to the I/O interface 905: an input part 906 including a keyboard, a mouse, or the like, an output part 907 including a cathode ray tube (CRT), a liquid crystal display (LCD), a speaker, or the like, a storage part 908 including a hard disk, or the like, and a communication part 909 including a network interface card such as a local area network (LAN) card or a modem. The communication part 909 performs communication processing by using a network such as the Internet. A driver 910 is also connected to the I/O interface 905 as desired. A removable medium 911, such as a magnetic disk, an optical disc, a magneto-optical disk, or a semiconductor memory, is installed on the drive 910 as desired, so that a computer program read from the removable medium is installed into the storage part 908 as desired.

According to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 909, and/or installed from the removable medium 911. When the computer program is executed by the CPU 901, various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or used in combination with an instruction execution system, an apparatus, or a device. In the present disclosure, the computer-readable signal medium may include a data signal transmitted in a baseband or as part of a carrier, and stores a computer-readable computer program. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wire, or the like, or any suitable combination thereof.

According to another aspect, the present disclosure further provides a computer-readable medium. The computer-readable medium may be included in the electronic device described in the embodiments, or may exist alone without being assembled into the electronic device. The computer-readable medium carries one or more programs, the one or more programs, when executed by the electronic device, causing the electronic device to implement the method described in the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering the present disclosure and practicing the implementations of the present disclosure, a person skilled in the art may easily conceive of other implementations of the present disclosure. The present disclosure is intended to cover any variation, use, or adaptive change of the present disclosure. These variations, uses, or adaptive changes follow the general principles of the present disclosure and include common general knowledge or common technical means in the art that are not disclosed in the present disclosure.

It is to be understood that the present disclosure is not limited to the precise structures described above and shown in the accompanying drawings, and various modifications and changes may be made without departing from the scope of the present disclosure. The scope of the present disclosure is limited only by the appended claims.

What is claimed is:

1. A video decoding method, comprising:
acquiring a coding block of a video image frame;
determining a partitioning mode available to the coding block according to a size of the coding block and an allowable maximum sub-block size ratio when determining that sub-block transform (SBT) is to be performed on the coding block;
determining, based on the partitioning mode available to the coding block, a target partitioning mode used during the SBT performed on the coding block; and
partitioning the coding block based on the target partitioning mode, and decoding a plurality of sub-blocks obtained through the partitioning,
wherein determining a partitioning mode available to the coding block comprises at least one of:
allowing a vertical half partitioning mode for the coding block when determining that a width of the coding block is greater than or equal to 8 and twice a height of the coding block is less than or equal to a product of the width and the maximum sub-block size ratio, or otherwise prohibiting the vertical half partitioning mode for the coding block;
allowing a vertical quad partitioning mode for the coding block when determining that a width of the coding block is greater than or equal to 16 and 4 times a height of the coding block is less than or equal to a product of the width and the maximum sub-block size ratio, or otherwise prohibiting the vertical quad partitioning mode for the coding block;
allowing a horizontal half partitioning mode for the coding block when determining that a height of the coding block is greater than or equal to 8 and twice a width of the coding block is less than or equal to a product of the height and the maximum sub-block size ratio, or otherwise prohibiting the horizontal half partitioning mode for the coding block; or
allowing a horizontal quad partitioning mode for the coding block when determining that a height of the coding block is greater than or equal to 16 and 4 times a width of the coding block is less than or equal to a product of the height and the maximum sub-block size ratio, or otherwise prohibiting the horizontal quad partitioning mode for the coding block.

2. The video decoding method according to claim 1, wherein when the vertical half partitioning mode or the vertical quad partitioning mode is allowed, the maximum sub-block size ratio is a maximum sub-block height-width ratio.

3. The video decoding method according to claim 1, wherein when the horizontal half partitioning mode or the horizontal quad partitioning mode is allowed, the maximum sub-block size ratio is a maximum sub-block width-height ratio.

4. The video decoding method according to claim 1, wherein the maximum sub-block size ratio includes a maximum width-height ratio and a maximum height-width ratio, a value of the maximum width-height ratio being equal to a value of the maximum height-width ratio, and the method further comprises:
decoding a value of the maximum sub-block size ratio from a sequence header of the video image frame.

5. The video decoding method according to claim 1, wherein the maximum sub-block size ratio includes a maximum width-height ratio and a maximum height-width ratio, a value of the maximum width-height ratio being not equal to a value of the maximum height-width ratio, and the method further comprises:
decoding the value of the maximum width-height ratio and the value of the maximum height-width ratio from a sequence header of the video image frame.

6. The video decoding method according to claim 1, wherein a value of the maximum sub-block size ratio is the same as a value of an allowable maximum coding block size ratio.

7. The video decoding method according to claim 1, further comprising:
performing a transform skip operation or an inverse transform operation.

8. A video decoding apparatus, comprising: a memory storing computer program instructions; and a processor coupled to the memory and configured to execute the computer program instructions and perform:
- acquiring a coding block of a video image frame;
- determining a partitioning mode available to the coding block according to a size of the coding block and an allowable maximum sub-block size ratio when determining that sub-block transform (SBT) is to be performed on the coding block;
- determining, based on the partitioning mode available to the coding block, a target partitioning mode used during the SBT performed on the coding block; and
- partitioning the coding block based on the target partitioning mode, and decoding a plurality of sub-blocks obtained through the partitioning wherein determining a partitioning mode available to the coding block comprises at least one of:
- allowing a vertical half partitioning mode for the coding block when determining that a width of the coding block is greater than or equal to 8 and twice a height of the coding block is less than or equal to a product of the width and the maximum sub-block size ratio, or otherwise prohibiting the vertical half partitioning mode for the coding block;
- allowing a vertical quad partitioning mode for the coding block when determining that a width of the coding block is greater than or equal to 16 and 4 times a height of the coding block is less than or equal to a product of the width and the maximum sub-block size ratio, or otherwise prohibiting the vertical quad partitioning mode for the coding block;
- allowing a horizontal half partitioning mode for the coding block when determining that a height of the coding block is greater than or equal to 8 and twice a width of the coding block is less than or equal to a product of the height and the maximum sub-block size ratio, or otherwise prohibiting the horizontal half partitioning mode for the coding block; or
- allowing a horizontal quad partitioning mode for the coding block when determining that a height of the coding block is greater than or equal to 16 and 4 times a width of the coding block is less than or equal to a product of the height and the maximum sub-block size ratio, or otherwise prohibiting the horizontal quad partitioning mode for the coding block.

9. The video decoding apparatus according to claim 8, wherein when the vertical half partitioning mode or the vertical quad partitioning mode is allowed, the maximum sub-block size ratio is a maximum sub-block height-width ratio.

10. The video decoding apparatus according to claim 8, wherein when the horizontal half partitioning mode or the horizontal quad partitioning mode is allowed, the maximum sub-block size ratio is a maximum sub-block width-height ratio.

11. The video decoding apparatus according to claim 8, wherein the maximum sub-block size ratio includes a maximum width-height ratio and a maximum height-width ratio, a value of the maximum width-height ratio being equal to a value of the maximum height-width ratio, and the processor is further configured to execute the computer program instructions and perform:
- decoding a value of the maximum sub-block size ratio from a sequence header of the video image frame.

12. A non-transitory computer-readable storage medium storing computer program instructions executable by at least one processor to perform:
- acquiring a coding block of a video image frame;
- determining a partitioning mode available to the coding block according to a size of the coding block and an allowable maximum sub-block size ratio when determining that sub-block transform (SBT) is to be performed on the coding block;
- determining, based on the partitioning mode available to the coding block, a target partitioning mode used during the SBT performed on the coding block; and
- partitioning the coding block based on the target partitioning mode, and decoding a plurality of sub-blocks obtained through the partitioning wherein determining a partitioning mode available to the coding block comprises at least one of:
- allowing a vertical half partitioning mode for the coding block when determining that a width of the coding block is greater than or equal to 8 and twice a height of the coding block is less than or equal to a product of the width and the maximum sub-block size ratio, or otherwise prohibiting the vertical half partitioning mode for the coding block;
- allowing a vertical quad partitioning mode for the coding block when determining that a width of the coding block is greater than or equal to 16 and 4 times a height of the coding block is less than or equal to a product of the width and the maximum sub-block size ratio, or otherwise prohibiting the vertical quad partitioning mode for the coding block;
- allowing a horizontal half partitioning mode for the coding block when determining that a height of the coding block is greater than or equal to 8 and twice a width of the coding block is less than or equal to a product of the height and the maximum sub-block size ratio, or otherwise prohibiting the horizontal half partitioning mode for the coding block; or
- allowing a horizontal quad partitioning mode for the coding block when determining that a height of the coding block is greater than or equal to 16 and 4 times a width of the coding block is less than or equal to a product of the height and the maximum sub-block size ratio, or otherwise prohibiting the horizontal quad partitioning mode for the coding block.

\* \* \* \* \*